United States Patent [19]
Geronimi et al.

[11] Patent Number: 5,629,513
[45] Date of Patent: May 13, 1997

[54] METHOD FOR THE FUNCTIONING OF A CHIP CARD, AND CHIP CARD IN ACCORDANCE THEREWITH

[75] Inventors: Francois Geronimi, Aix En Provence; Edouard Gordons, Aubagne, both of France

[73] Assignee: Gemplus Card International, Gemenos, France

[21] Appl. No.: 400,237

[22] Filed: Mar. 3, 1995

[30] Foreign Application Priority Data

Mar. 4, 1994 [FR] France ................... 94 02529

[51] Int. Cl.⁶ .............................................. G06K 19/06
[52] U.S. Cl. ................................................ 235/492
[58] Field of Search .......................... 235/380, 492, 235/441, 379; 340/825.34; 902/26, 29

[56] References Cited

U.S. PATENT DOCUMENTS

| | | | |
|---|---|---|---|
| 4,810,862 | 3/1989 | Nakano et al. | 235/380 |
| 4,855,578 | 8/1989 | Hirokawa et al. | 235/380 |
| 4,939,353 | 7/1990 | Iijima | 235/492 |
| 5,039,850 | 8/1991 | Yamaguchi | 235/492 |
| 5,126,541 | 6/1992 | Shinagawa | 235/438 |
| 5,296,687 | 3/1994 | Geronimi | 235/380 |
| 5,442,162 | 8/1995 | Atsumi et al. | 235/492 |
| 5,477,039 | 12/1995 | Lisimaque | 235/380 |

FOREIGN PATENT DOCUMENTS

| | | | |
|---|---|---|---|
| 0361491 | 4/1990 | European Pat. Off. | 235/380 |
| 0437386 | 7/1991 | European Pat. Off. | 235/380 |
| 2638002 | 4/1990 | France | 235/380 |

*Primary Examiner*—Donald T. Hajec
*Assistant Examiner*—Le Thien Minh
*Attorney, Agent, or Firm*—Nilles & Nilles, S.C.

[57] ABSTRACT

The disclosure relates to chip cards and their functioning. When a chip card goes from a first state (A) to a second state (B), functions that were available in the first state are prohibited. To enable the analysis of the malfunctions of the card during a stage of qualification by the testing of an application under real-life experimental conditions, these functions need to be retrieved when a card suffers a malfunction. The invention proposes the placing, in the card, of two state indicators, the first indicator prohibiting the functions that are unnecessary for the step B and the second indicator checking the possibility of making the card return to the step A to retrieve the prohibited functions. The card reader may give the card a command for a return to the state A. This command is verified by the card. If the indicator is in a state that permits the return and if the command is correct, the first indicator is reset in the state corresponding to A. If not, the command is rejected. If the command given is incorrect, the indicator is permanently placed in the state in which it prohibits the return to the State A.

17 Claims, 2 Drawing Sheets

METHOD FOR THE FUNCTIONING OF A CHIP CARD, AND CHIP CARD IN ACCORDANCE THEREWITH

BACKGROUND OF THE INVENTION

The invention relates to the microcircuit cards generally known as chip cards.

Present-day chip cards are becoming increasingly sophisticated and now often have a microprocessor so that the card can work under the control of instruction programs incorporated into the card.

The instruction programs comprise, firstly, the general programs of an operating system and, secondly, application programs. The operating system essentially defines the internal working of the card and the communication protocols with the exterior. The application programs use the possibilities of the operating system to make the card perform tasks that depend on the application envisaged: for example an application pertaining to a money transaction will use application programs devised by a bank; another bank could prepare different application programs using the same cards and the same operating system. A distributor of services (such as telephone services, etc.) could devise its own application programs, again using the same operating system.

The life cycle of a chip card can be generally divided into major steps, namely:

1. Manufacture and pre-customizing
2. Customizing
3. Use.

At each of these steps, the card has a different owner and different functions. The owner in the step 1 is generally the manufacturer of the card, in the step 2, it is provider of a service and in the step 3 it is the final user of the services of the provider.

During manufacture, the manufacturer pre-customizes the card in an operation that consists in the recording, in the card, of the data elements that are specific to his customer who is the provider of services.

Then, the provider of services receives the card and records therein application programs and customizing data relating to his client who is the final user.

Finally, the ultimate user uses the card to obtain the services for which the card has been defined and programmed.

The steps 1 and 2 are those used by the manufacturer and the provider of services to define an operational configuration of the card. To achieve this configuration, the manufacturer and the provider of services use powerful memory write and read commands to which the final user will absolutely have no access. And the manufacturer may use commands that are more powerful than those used by the provider of services.

This term "more powerful command" may mean, for example, that the manufacturer has access in read and write mode to absolutely all the non-volatile memory zones of the card. The provider of the service will not have access to certain zones such as those identifying solely the provider of services for the needs for which the card has been manufactured. Nor will it have access to program zones that the manufacturer considers to be confidential. And the user will not have access to certain program and data zones that the provider of services considers to be confidential or to zones used to ensure the security of transactions against fraud.

During the passage from one step to another, the owner at the step considered implements measures for the passage to the next step that generally comprise an irreversible prohibition of a return to the previous step. These measures may include, for example, the irreversible breakdown of physical fuses or logic fuses (non-volatile memory cells that are programmable only once) to prohibit access to memory zones. The manufacturer may blow fuses and the provider of services may blow other fuses.

One problem that is increasingly being encountered relates to the growing complexity of the programs loaded into chip cards and the growing increase in the quantities of data stored in memory cards.

It is thus increasingly difficult to devise application programs. As a result, unexpected malfunctioning may occur despite the very thorough checks performed during the devising of these programs. The operating system itself is becoming increasingly more sophisticated and is not safe against unexpected malfunctioning.

These malfunctions occur during the use of the card by the ultimate users whether in a context of abnormal use of the card or even normal use.

However, at the final step of use, there is no longer access to certain memory zones whose examination could however be indispensable to detecting the source of the problem and to helping in its resolution. Since all that is available is the symptom of malfunctioning perceived by the user who can no longer use his card normally, it is very difficult to trace the cause order to overcome it. The cause may be technological or software-related.

The result thereof for the manufacturer and possibly also for the provider of services is a loss of valuable information that could be used to devise an entirely satisfactory product.

The invention proposes an approach to improve the quality of products by facilitating the search for the causes of the malfunctions observed.

The following is the approach according to the invention: the card has a first state indicator defining the step of the life cycle in which the card is located. Another state indicator defines the right to return to the previous step. A command to return to the previous step enables the state of the first indicator to be modified. This command, which can be performed by the operating system of the card, cannot be used except for a determined state of the second indicator. The change in state of the second indicator permanently prohibits the use of the return command.

Preferably, an incorrect use of the return command places the second indicator in a state that permanently prohibits the use of the command. The command to return has, to this effect, parameters that must meet certain criteria (verified by the operating system of the card) so that the command is considered to be correct.

Preferably again, the parameters of the command bring into play the result of an enciphering algorithm that makes use of secret and/or public data. These parameters are computed by the card reader to send out the correct command. The command is received by the card which checks the parameters sent and prohibits the use (and any future use) of the command to return if there is any divergence between the parameters received and the parameters computed.

Thus, the card undergoes a life cycle in which there is introduced an additional step that may be called a qualification step, between the customizing step and the step of use, wherein the card can be used but wherein the possibility of checking the confidential data of the card in the event of a problem is temporarily preserved. This possibility is controlled by means of the use of secret codes and enciphering algorithms so that it is not accessible to the final user and so that it is reserved rather for the manufacturer (if necessary for the provider of the surface).

SUMMARY OF THE INVENTION

The method of functioning of a chip card according to the invention therefore comprises the use of two state indicators internal to the card to define two states of the card, these indicators having the following particular features:

the first indicator is capable of being changed from a first value to a second value during the passage of the card from a first state to a second state;

for this second value, the first indicator prohibits certain functions of the card which were permitted for the first state of the card;

the first indicator may be reset, under the control of the second indicator, at its first value where it again permits said functions;

the second state indicator is capable of being set at the first value where it permits the return of the first indicator to its first value or to a second value where it prohibits this return;

the first indicator is reset at its first value under the control of a return instruction applied to the card, provided that the second indicator does not have its second value;

and the application of an erroneous instruction places the second indicator at its second value prohibiting the return of the first indicator to its first value.

The first state of the card is preferably a state of manufacture or customization. The second state is preferably the state of use (the owner of the card is the final user), but may also be the state of customization (the owner is a provider of services that can be used by the card holders).

BRIEF DESCRIPTION OF THE DRAWINGS

Other features and advantages of the invention shall appear from the following detailed description made with reference to the appended drawing wherein.

MORE DETAILED DESCRIPTION

Figure 1:
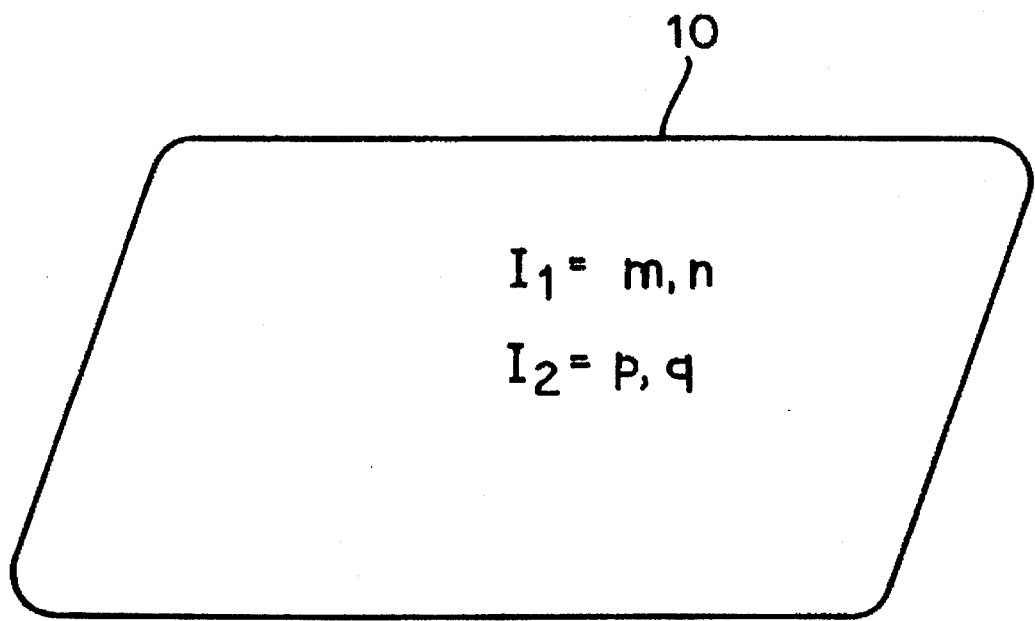
FIG. 1 shows a chip card having first and second indicators in accordance with the present invention.
Figure 2:
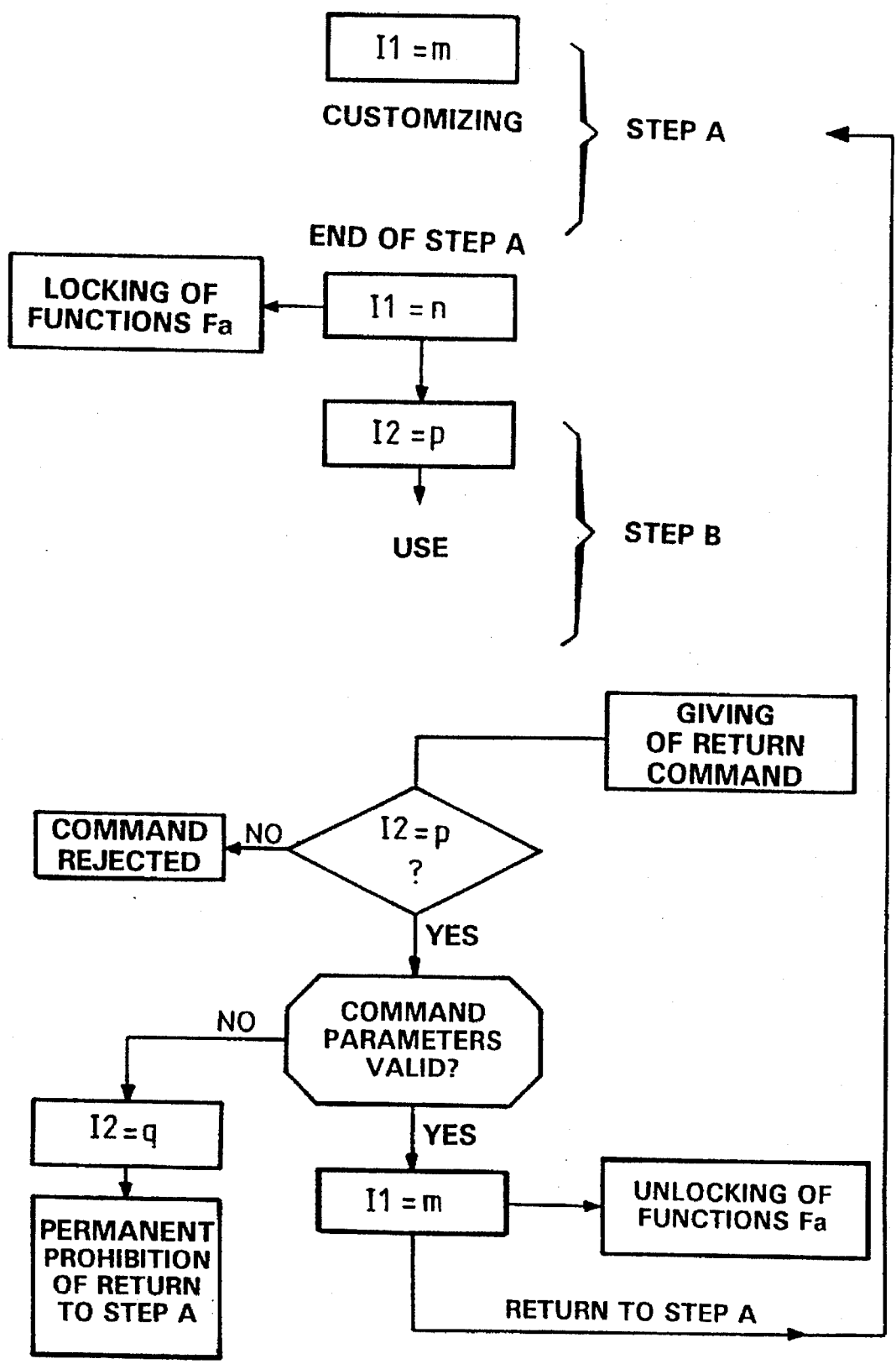
FIG. 2 shows a general flow chart of the method according to the invention.

Referring now to FIGS. 1 and 2, it is assumed in this exemplary application of the method according to the invention that the card 10 is initially in a first state (state A) corresponding for example to the customization cycle (the provider of services is the owner and has control, inter alia, over certain specific functions of the step A designated by Fa, notably functions of access to certain memory zones of the card).

In this first state of the card, a first state indicator I1 has a first value m. For this value m, the specific functions Fa are available. They are indeed controlled by the state of the indicator 11. The indicator I1 may be formed by a set of memory cells forming a word of one or more bytes for example. It will be noted that the value of the indicator may define many other states of the card if it is desired.

It is sought to pass to the next step (second state B of the card) which is that of the use of the card by a user who becomes the owner of the card in this state. The user herein is the person who may make use of the card to obtain the benefit of goods or services offered by the provider of services. In this second state B, the functions Fa do not have to be accessible to the user. They are rendered inoperative and the state indicator I1 is used both to indicate and control this inoperative condition.

The provider of services launches the performance of an instruction relating to a change in state that may be summarized essentially in the following functions:

the first state indicator I1 is set at a second value n representing the state B;

for this second value n, the functions Fa become unavailable, the indicator I1 making direct or indirect checks on the access to these functions (by physical circuits or software prohibitions forming part of the operating system of the card and implementing an examination of the state of the indicator I1);

a second state indicator I2 is at the same time set at a first value p; this first value p indicates and checks the possibility of resetting the first indicator at its first value; the value p may be the value n (redundant indicators, one being used to check the other).

The card is then given to the user with only the possibilities allowed to him or her, namely without access to the functions Fa which are to be barred to him or her.

However, there is a possibility of retrieving these functions, but this possibility is not offered to the user. It can be implemented only by the supplier of services, or even only by the manufacturer.

If the card works normally for the user, this possibility of return is in principle never implemented.

However, if the card has operating defects, it may be returned to the supplier of services who will then try to analyze the defects by examining memory zones whose reading should no longer be possible in the state B of the card.

For this purpose, the provider of services will use a command for a return to the state A. The command is an instruction sent out from a card reader and it is performed inside the card. In general, the invention is designed to be implemented for microprocessor cards capable of carrying out received instructions (under the control of the card operating system).

This command has confidentiality of use. It is not desirable that the user of the card should be capable of applying it.

The command may therefore bring about the implementation of an encryption algorithm or a secret code. For example, the command is constituted by an instruction code followed by parameters and is performed by the operating system of the card only if the parameters correspond to those that are expected.

The parameters sent may be the result of a computation bringing into play the series number of the card (which may be read by the reader). Thus, the contents of the return command are not fixed but vary as a function of the card used, thus improving safety. The computation may be a function of encryption with a public or secret key.

The operating system of the card verifies the command by using the same computation function as the card reader which prepares and sends the return command. If the verification leads to an acceptance of the command and if the second indicator is in its first state (I2=p, permitting the return to the state A), the return command is performed. Otherwise, the second indicator I2 is immediately placed (by the operation system of the card) in a second state I2=g whence it can no longer emerge and where it permanently prohibits any command for a return to the state A.

If the return command is carried out by the card, the first indicator I1 is reset tn its first state I1=m, and the functions Fa available in this state are again made accessible. The provider of the service may then investigate the causes of the malfunctioning of the card by examining memory zones likely to help in this investigation.

The card may again be reset in its second state B and given to the user. The second indicator I2 will be put in its first state I2=p if it is still desired to retain the possibility of a return to the state A. Otherwise it will be placed in its second state I2=g to permanently prohibit the return to the state A. To place the second indicator in its second state, it is enough to give the card with a return command with an erroneous parameter. The return command will not be performed, and the second indicator will be permanently locked at I2=g, the functions Fa being permanently locked.

A case may be envisaged where this method is used during a stage for the qualification of the card in real-life experimental conditions: for example, an application planned for nationwide application may be implemented on an experimental basis in one city. All the cards are then provided with an operating system with the possibility of a command for a return to the initial functions. The cards are then examined during this qualification stage, notably whenever malfunctioning appears. The application programs are modified until, little by little, all the possible malfunctions are corrected. At the end of the stage of experiments in the city, the finalized application may be extended to the entire country. This time, the provider of the service will distribute cards to the users having their locking command permanently blocked (it is easy for the provider to routinely make a wrong return command before distributing the cards to the users).

Naturally, provision may be made for a case where changes in state of the card, with the possibility of return, can be made successively without losing the benefit of permitted return commands. Thus, if the card goes from the first state A to the second state B with permission to return, then from the second state to a third state C with again permission for the return command without cancellation of the first return command, then it is possible to return from the third state to the second state and then from the second state to the first state. There is thus a sort of "transitivity" of the successive return commands.

What is claimed is:

1. A method of functioning of a chip card comprising the use of first and second state indicators internal to the chip card to define two states of the card, the method comprising the steps of:

permitting, during a first state of the chip card, certain functions of the chip card to be performed;

changing the first indicator from a first state value to a second state value during the passage of the chip card from the first state to a second state;

prohibiting, during the second state of the card, the certain functions of the chip card which were permitted during the first state of the card;

resetting the first indicator to the first state value, and subsequently permitting the certain functions to be performed after the first indicator is reset to the first state value;

wherein the resetting of the first indicator is permitted when the second indicator is set at a first value and is prohibited when the second indicator is set at a second value;

wherein the first indicator is reset to the first state value under the control of a rerun instruction received at the card;

and wherein the reception of a return instruction which is erroneous places the second indicator at the second value which prohibits the resetting of the first indicator to the first state value.

2. A method of functioning according to claim 1,
   wherein the first state of the card is a state in which the card has functions reserved for the manufacturer of the card, and
   wherein the second state is a state in which the card has functions permitted for a provider of services.

3. A method according to claim 1,
   wherein the first state is a state in which the card has functions reserved for a provider of services, and
   wherein the second state is a state in which the card is distributed to a user of services of the provider of services, the user being incapable of gaining access to these functions.

4. A method according to claim 1, further comprising the step of permanently placing the second indicator at its second value.

5. A method according to claim 2, further comprising the step of permanently placing the second indicator at its second value.

6. A method according to claim 3, further comprising the step of permanently placing the second indicator at its second value.

7. A method according to claim 1, wherein the return instruction is formed of an instruction code followed by parameters, and further comprising the step of using a decryption algorithm to determine whether the return instruction is erroneous.

8. A method of operating a chip card having first and second states, comprising the steps of providing a first indicator, the first indicator defining the state of the chip card such that the first indicator is set at a first state value when the chip card is in a first state and is set at a second state value when the chip card is in a second state, and wherein certain functions are permitted to be performed when the chip card is in the first state and are not permitted to be performed when the chip card is in the second state;

providing a second indicator, the second indicator defining a right to return to the first state of the chip card, the right existing when the second indicator is at a first value and the right not existing when the second indicator is at a second value, and wherein the value of the second indicator is determined based upon whether an invalid return instruction has been received;

advancing the chip card from the first state to the second state, and as a result changing the value of the first indicator from the first state value to the second state value;

receiving a return instruction at the chip card;

ascertaining whether the return instruction is valid and ascertaining whether the second indicator is at the first value, and, if the return instruction is valid and the second indicator is at the first value, then returning the chip card to the first state, and, if the rerun instruction is valid but the second indicator is not at the first value, then not returning the chip card to the first state, and, if the second indicator is at the first value but the return instruction is not valid, then not returning the chip card to the first state, and, if the return instruction is not valid and the second indicator is not at the first value, then setting the second indicator to the second value and not returning the chip card to the first state.

9. A method according to claim 8,
wherein the first state is a state in which the card has functions reserved for the manufacturer of the card, and
wherein the second state is a state in which the card has functions permitted for a provider of services.

10. A method according to claim 8,
wherein the first state is a state in which the card has functions reserved for a provider of services, and
wherein the second state is a state in which the card is distributed to a user of services of the provider of services, the user being incapable of gaining access to the functions reserved for the provider of services.

11. A method according to claim 8, further comprising the step of receiving the invalid return instruction and, in response, permanently preventing the chip card from returning to the first state.

12. A method according to claim 11, wherein the invalid return instruction is intentionally sent by a provider of services after a remainder of software utilized by the chip card has undergone experimental testing.

13. A method according to claim 8, wherein the return instruction is formed of an instruction code followed by parameters, and further comprising the step of using a decryption algorithm to determine whether the return instruction is valid.

14. A method according to claim 13, wherein the parameters are based on a series number of the chip card.

15. A chip card comprising
a first indicator means for defining the state of the chip card, wherein certain functions are permitted to be performed when the chip card is in a first state and are not permitted to be performed when the chip card is in a second state;
a second indicator means for defining a right to return to a previous state of the chip card, the right existing when the second indicator is at a first value and the right not existing when the second indicator is at a second value, and wherein the value of the second indicator is determined based upon whether an invalid return instruction has been received;
means for ascertaining whether a return instruction received at the chip card is valid and means for ascertaining whether the second indicator is at the first value,
said ascertaining means returning the chip card to the first state if the return instruction is valid and the second indicator is at the first value,
said ascertaining means not returning the chip card to the first state if the return instruction is valid but the second indicator is not at the first value,
said ascertaining means permanently preventing the chip card from returning to the first state by permanently setting the second indicator to the second value if the second indicator is at the first value but the return instruction is not valid, and
said ascertaining means permanently preventing the chip card from returning to the first state by permanently setting the second indicator to the second value if the return instruction is not valid and the second indicator is not at the first value.

16. A chip card according to claim 15,
wherein the first state is a state in which the card has functions reserved for the manufacturer of the card, and
wherein the second state is a state in which the card has functions permitted for a provider of services.

17. A method according to claim 15,
wherein the first state is a state in which the card has functions reserved for a provider of services, and
wherein the second state is a state in which the card is distributed to a user of services of the provider of services, the user being incapable of gaining access to the functions reserved for the provider of services.

* * * * *